US010632539B2

(12) United States Patent
Huber et al.

(10) Patent No.: US 10,632,539 B2
(45) Date of Patent: Apr. 28, 2020

(54) DEVICE FOR THE FINE MACHINING OF A CIRCUMFERENTIAL WORKPIECE SURFACE AND METHOD FOR OPERATING THE DEVICE

(71) Applicant: Supfina Grieshaber GmbH & Co. KG, Wolfach (DE)

(72) Inventors: Michael Huber, Bad Rippoldsau (DE); Markus Mueller, Oberwolfach (DE); Martin Seger, Wolfach (DE); Alfons Haas, Sankt Roman/Wolfach (DE); Oliver Hildebrandt, Hornberg (DE)

(73) Assignee: SUPFINA GRIESHABER GMBH & CO. KG, Wolfach (DE)

( * ) Notice: Subject to any disclaimer, the term of this patent is extended or adjusted under 35 U.S.C. 154(b) by 911 days.

(21) Appl. No.: 14/321,856

(22) Filed: Jul. 2, 2014

(65) Prior Publication Data
US 2015/0013510 A1    Jan. 15, 2015

(30) Foreign Application Priority Data

Jul. 9, 2013 (EP) .................................... 13175727

(51) Int. Cl.
*B23B 5/18* (2006.01)
*B24B 21/16* (2006.01)
(Continued)

(52) U.S. Cl.
CPC ................. *B23B 5/18* (2013.01); *B23Q 5/22* (2013.01); *B24B 5/42* (2013.01); *B24B 19/12* (2013.01);
(Continued)

(58) Field of Classification Search
CPC .. B23B 5/18; B24B 5/42; B24B 19/12; B24B 21/02; B24B 21/16; Y10T 82/19; Y10T 82/195
See application file for complete search history.

(56) References Cited

U.S. PATENT DOCUMENTS 2,268,200 A * 12/1941 Groene ..................... B23B 5/18
                                                                    82/106
5,367,866 A    11/1994 Phillips
(Continued)

FOREIGN PATENT DOCUMENTS

DE        4235408 A1    4/1994
DE       10009980 C1    8/2001
(Continued)

OTHER PUBLICATIONS

Machine translation of Millot FR 2825652 (Year: 2002).*

*Primary Examiner* — Timothy V Eley
*Assistant Examiner* — Marcel T Dion
(74) *Attorney, Agent, or Firm* — Leydig, Voit & Mayer, Ltd.

(57) ABSTRACT

A device for the fine machining of a circumferential workpiece surface arranged eccentrically relative to an axis of a workpiece. The device comprises a pressure mechanism configured to press a fine-machining tool against the circumferential workpiece surface. The device also includes a drive unit configured to drive an active section of the pressure mechanism via a first drive and a second drive. The first drive drives the active section in a movement plane that runs crosswise to the workpiece axis along a first movement trajectory. The second drive drives the active section along a second movement trajectory that is at an angle to the first movement trajectory.

14 Claims, 8 Drawing Sheets

(51) Int. Cl.
*B24B 5/42* (2006.01)
*B24B 19/12* (2006.01)
*B24B 35/00* (2006.01)
*B23Q 5/22* (2006.01)

(52) U.S. Cl.
CPC .............. *B24B 21/16* (2013.01); *B24B 35/00* (2013.01); *B23B 2270/54* (2013.01); *Y10T 82/10* (2015.01); *Y10T 82/19* (2015.01); *Y10T 82/2531* (2015.01)

(56) References Cited

U.S. PATENT DOCUMENTS

| | | | | |
|---|---|---|---|---|
| 5,628,678 | A * | 5/1997 | Tridico .................... | B24B 21/02 451/296 |
| 5,803,796 | A * | 9/1998 | Barton, II ................. | B24B 5/42 451/168 |
| 5,951,377 | A * | 9/1999 | Vaughn .................... | B24B 5/42 451/14 |
| 6,088,924 | A * | 7/2000 | Esteve .................... | B23Q 17/20 33/550 |
| 6,220,946 | B1 * | 4/2001 | Arnold ..................... | B24B 5/42 451/307 |
| 2001/0031613 | A1 | 10/2001 | Muller et al. | |
| 2004/0029499 | A1 * | 2/2004 | Bonachera .............. | B24B 19/12 451/62 |
| 2004/0072521 | A1 * | 4/2004 | Pflager .................... | B24B 5/42 451/415 |
| 2004/0166767 | A1 * | 8/2004 | Hasegawa ................ | B24B 5/42 451/5 |
| 2007/0054598 | A1 * | 3/2007 | Uchida .................... | B23Q 5/28 451/5 |
| 2008/0102733 | A1 * | 5/2008 | Harter ..................... | B24B 47/16 451/5 |
| 2010/0236314 | A1 * | 9/2010 | Weigmann .............. | B24B 21/02 72/324 |
| 2013/0189909 | A1 | 7/2013 | Hildebrandt et al. | |
| 2013/0189910 | A1 * | 7/2013 | Hildebrandt ............ | B24B 21/02 451/317 |

FOREIGN PATENT DOCUMENTS

| | | | |
|---|---|---|---|
| EP | 2617522 A1 | 7/2013 | |
| FR | 2825652 A1 * | 12/2002 | ............... B24B 5/42 |
| FR | 2825652 A1 | 12/2002 | |

* cited by examiner

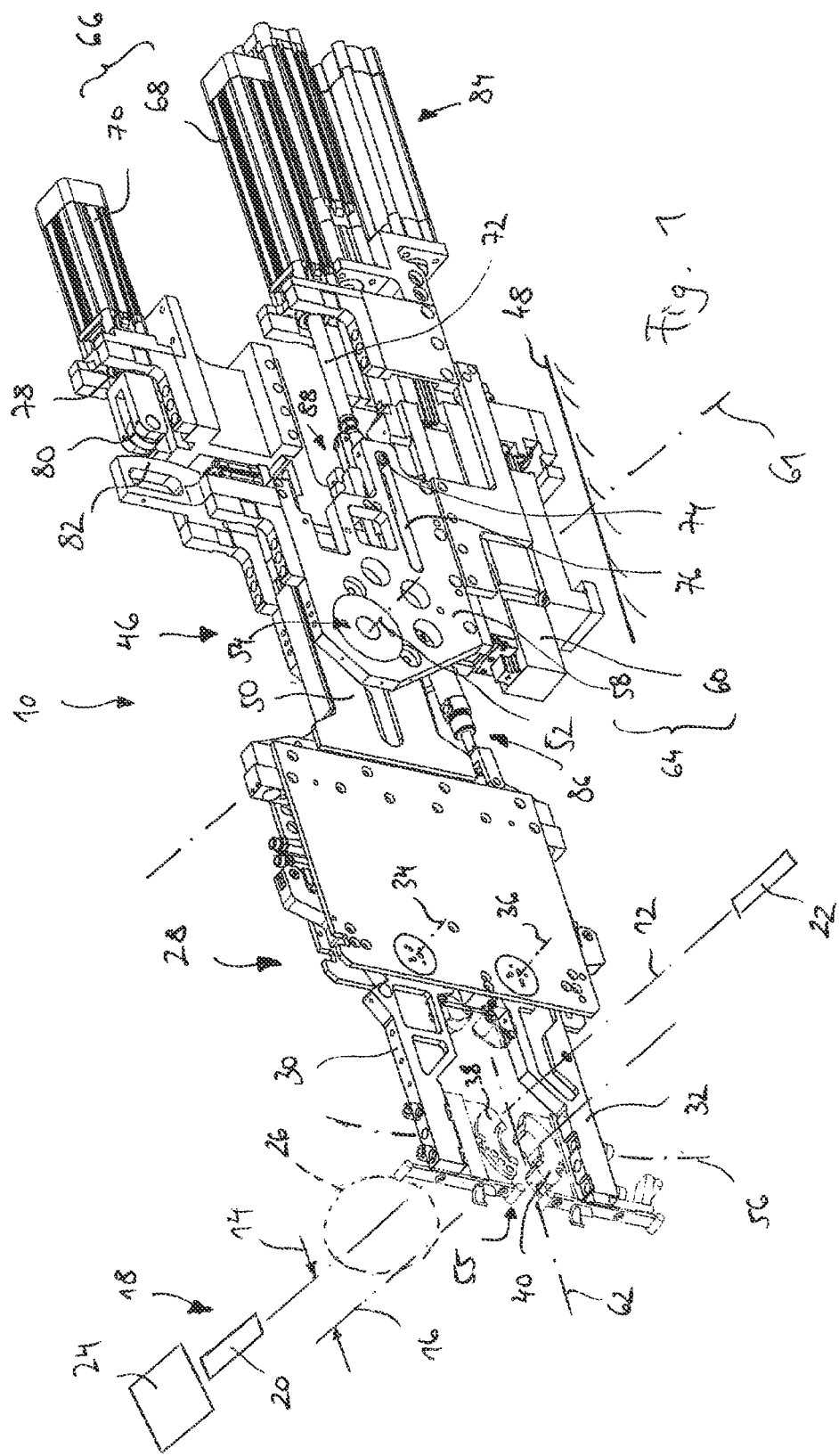

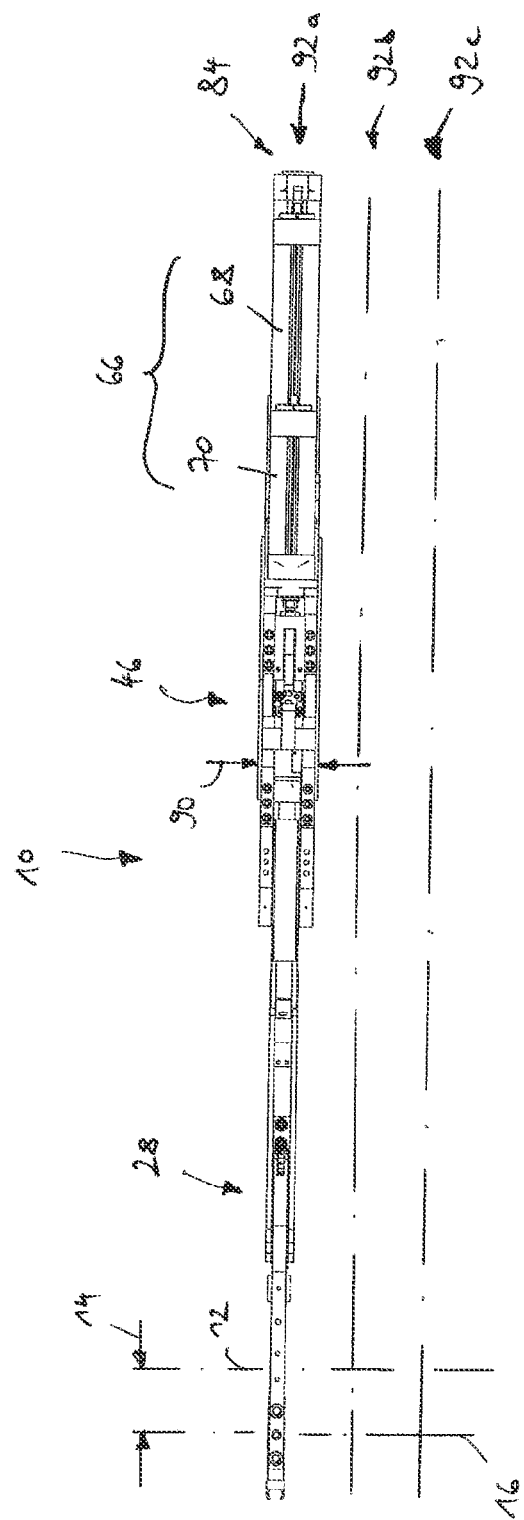

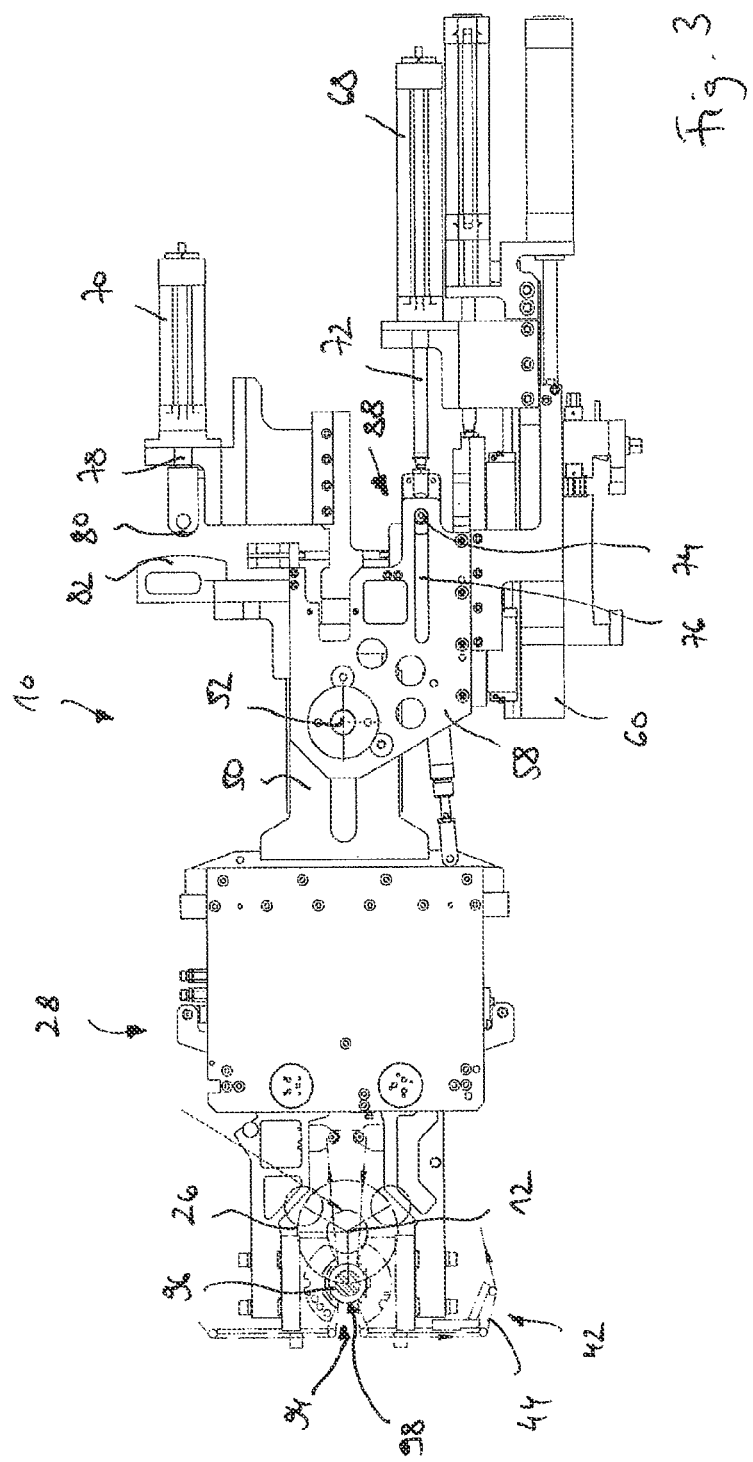

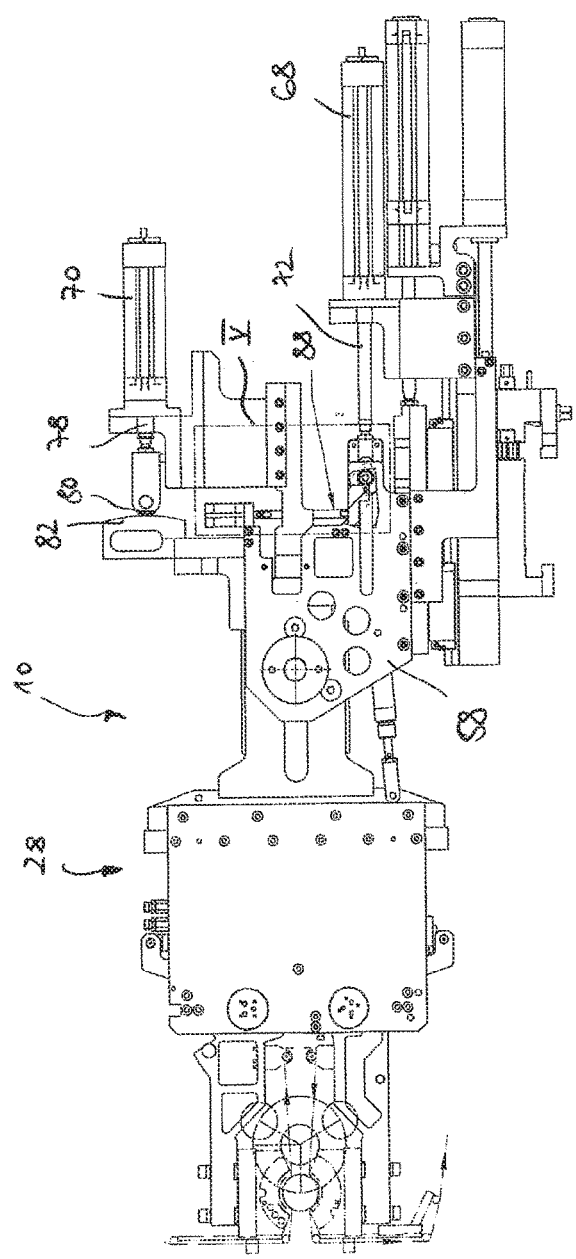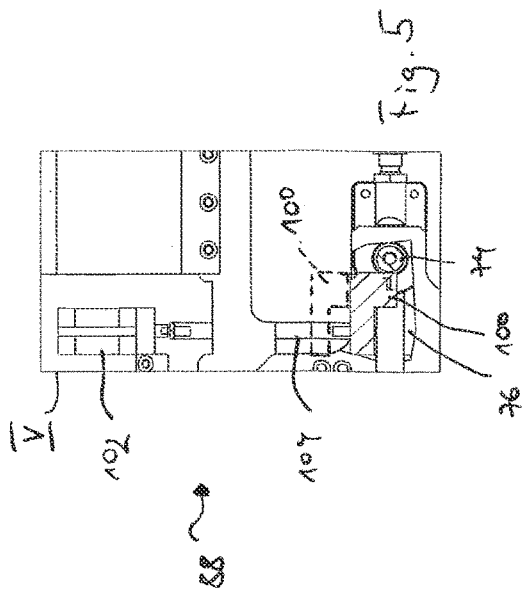

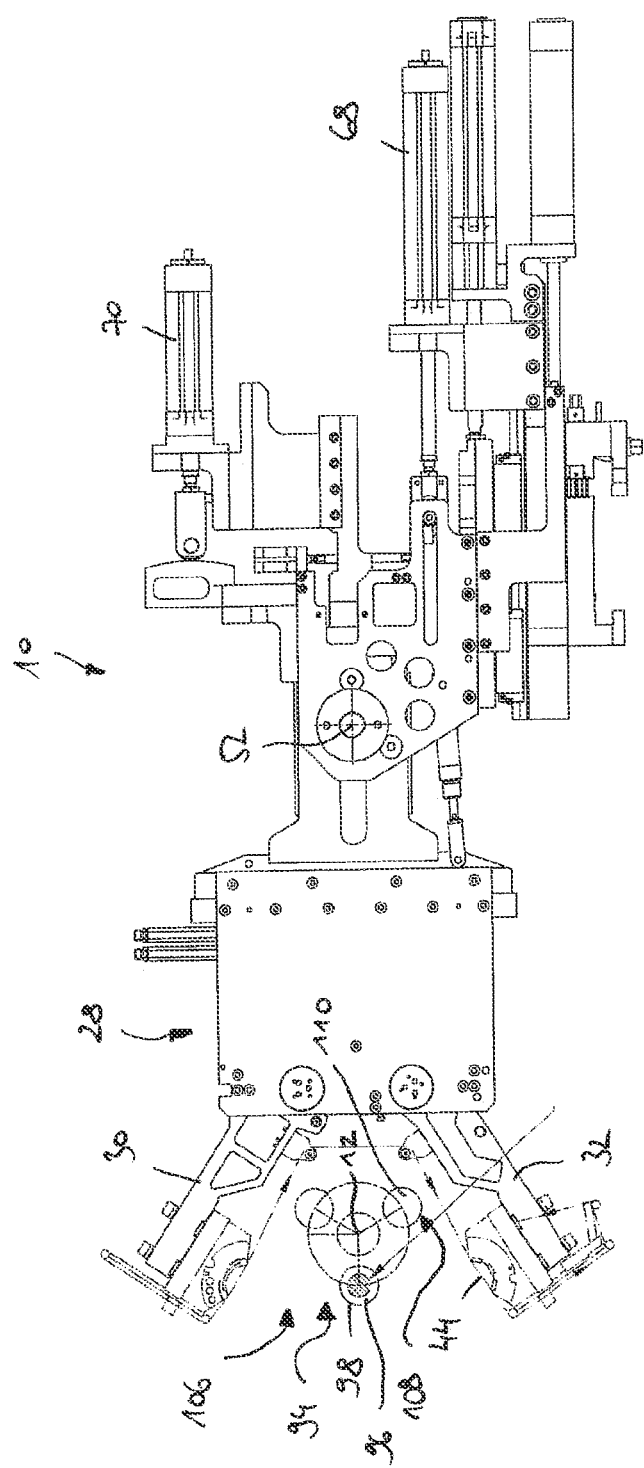

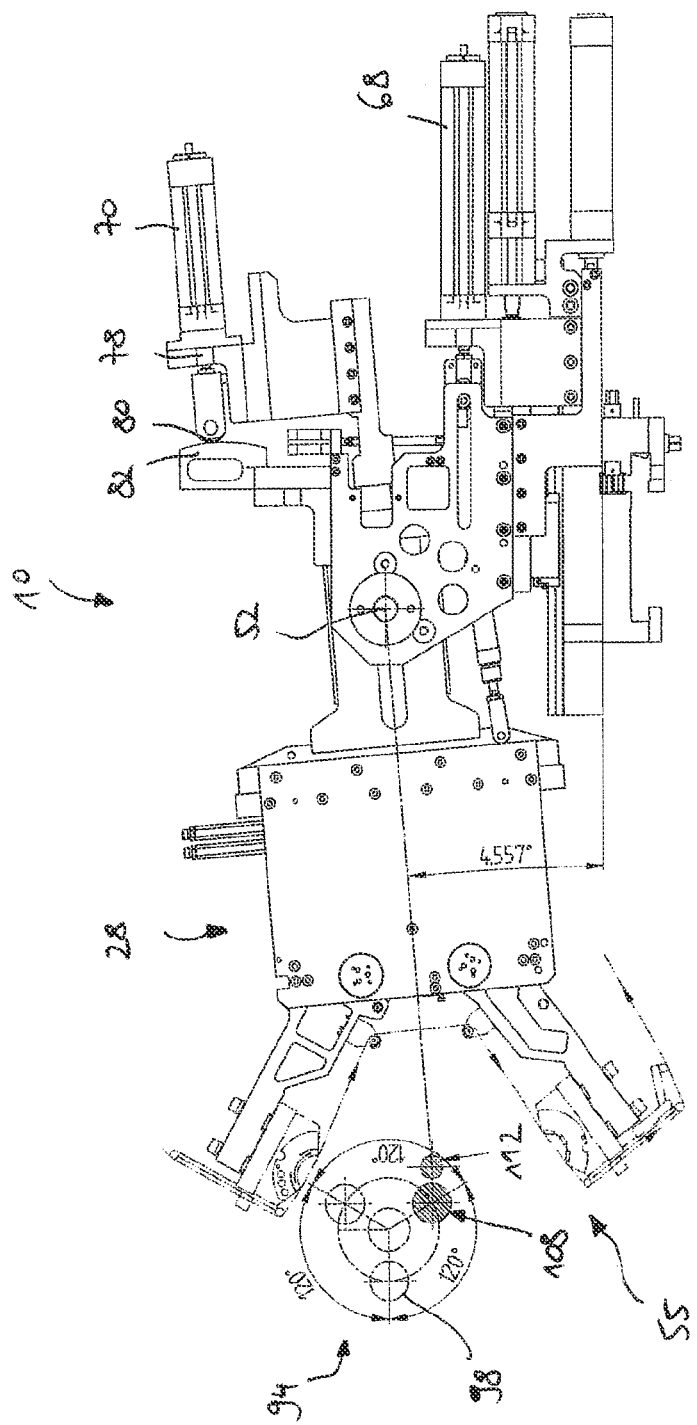

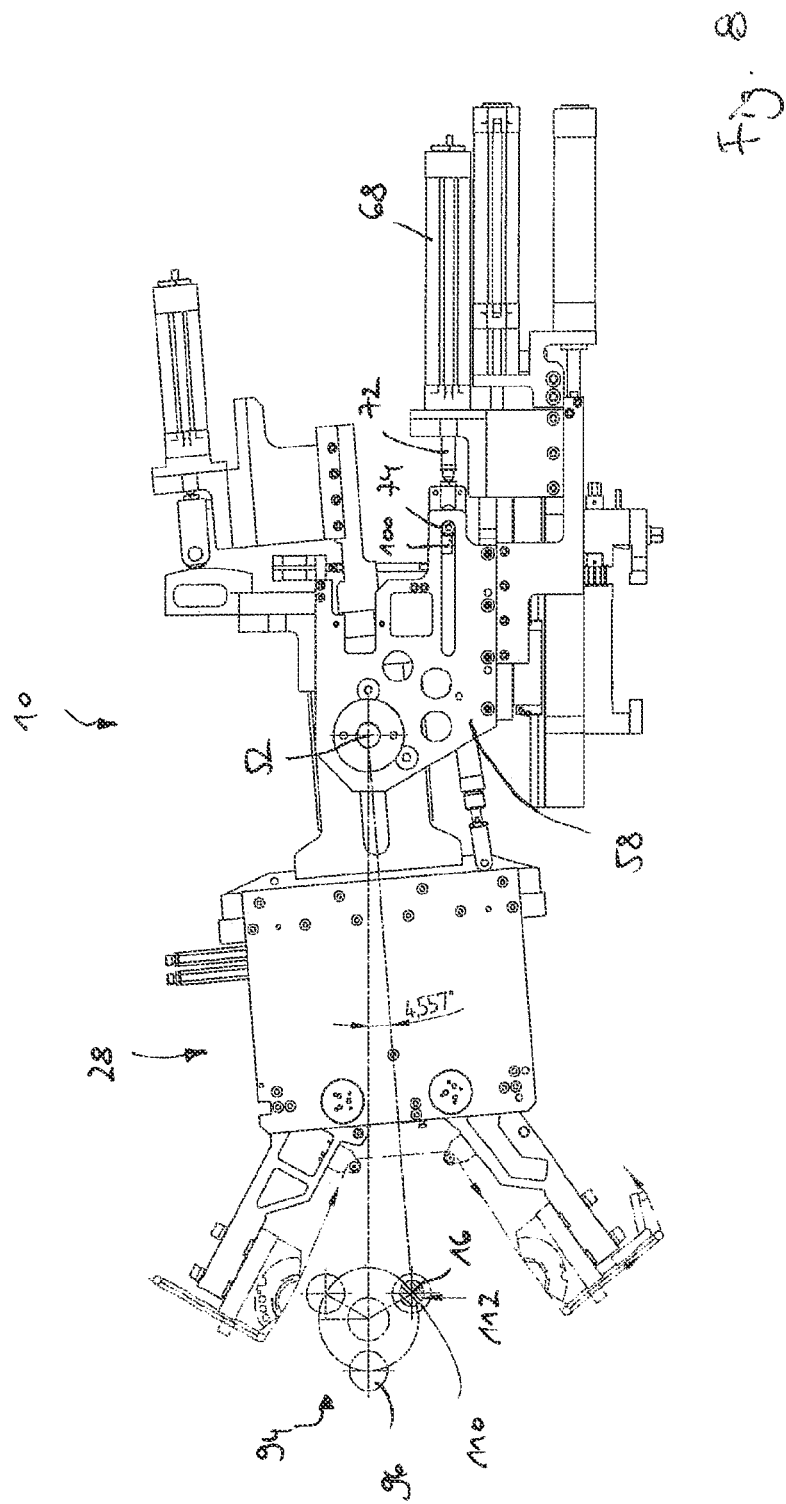

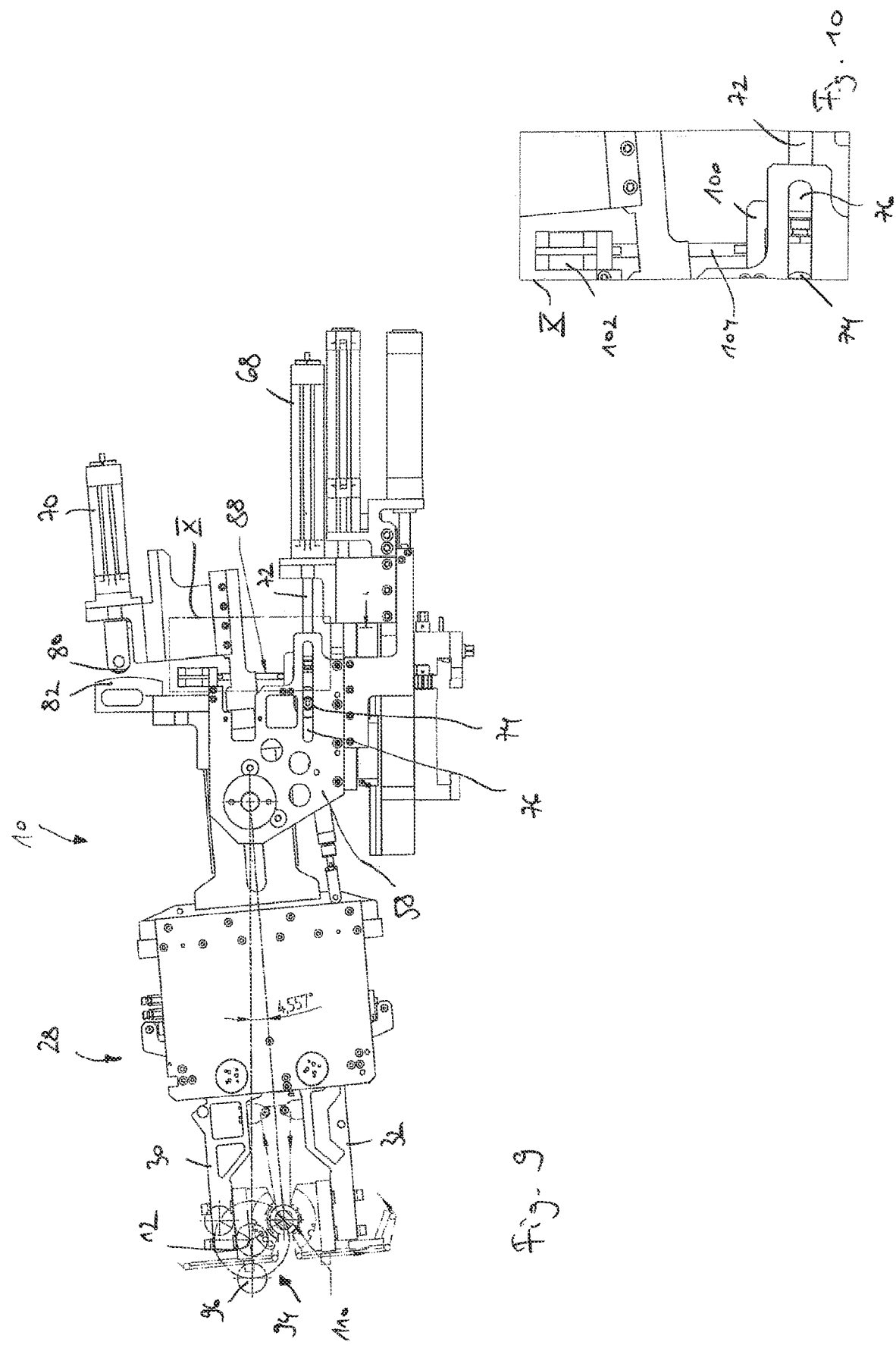

DEVICE FOR THE FINE MACHINING OF A CIRCUMFERENTIAL WORKPIECE SURFACE AND METHOD FOR OPERATING THE DEVICE

CROSS-REFERENCE TO RELATED APPLICATIONS

Priority is claimed to European Patent Application No. EP 13 175 727.0, filed on Jul. 9, 2013, the entire disclosure of which is hereby incorporated by reference herein.

FIELD

The invention relates to a device for the fine machining of a circumferential workpiece surface that is arranged eccentrically relative to the axis of a workpiece, especially of a lifting bearing of a crankshaft or of a camshaft, said device having a pressure mechanism to press a fine-machining tool against the circumferential workpiece surface.

BACKGROUND

The bearing surfaces of crankshafts and camshafts are machined several times consecutively when extremely high demands are made of their surface quality. Moreover, particularly with crankshafts and camshafts of multi-cylinder internal combustion engines, numerous bearing surfaces have to be machined. These factors entail long machining times.

German patent specification DE 100 09 980 C1 describes a device for the finish machining of crankshafts and camshafts. The device comprises a pressure mechanism for pressing a finishing belt against a bearing surface of the workpiece that is to be machined. While the bearing surface is being machined, the workpiece is rotated around its axis. In this process, the bearing surface that is arranged eccentrically relative to the workpiece axis is moved along a circular trajectory around the workpiece axis. The pressure mechanism is held on a compound rest slide so that the pressure mechanism can follow the movement along the circular trajectory of the bearing surface that is to be machined.

It has been found that, when the devices known from the state of the art are used for the fine machining of circumferential workpiece surfaces, the requisite machining times can only be shortened slightly or not at all.

SUMMARY

In an embodiment, the present invention provides a device for the fine machining of a circumferential workpiece surface arranged eccentrically relative to an axis of a workpiece. The device comprises a pressure mechanism configured to press a fine-machining tool against the circumferential workpiece surface. The device also includes a drive unit configured to drive an active section of the pressure mechanism via a first drive and a second drive. The first drive drives the active section in a movement plane that runs crosswise to the workpiece axis along a first movement trajectory. The second drive drives the active section along a second movement trajectory that is at an angle to the first movement trajectory.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 1 is a perspective view of an embodiment of a device for the fine machining of a workpiece for finishing purposes;

FIG. 2 is a top view of the device according to FIG. 1;

FIG. 3 is a side view of the device according to FIG. 1 for completing a main machining time phase of the circumferential workpiece surface;

FIG. 4 is a side view corresponding to FIG. 3, in a first idle time phase;

FIG. 5 is an enlarged view of a section, designated as V in FIG. 4;

FIG. 6 is a side view corresponding to FIG. 3, in a second idle time phase;

FIG. 7 is a side view corresponding to FIG. 3, in a third idle time phase;

FIG. 8 is a side view corresponding to FIG. 3, in a fourth idle time phase;

FIG. 9 is a side view corresponding to FIG. 3, in a final idle time phase;

FIG. 10 is an enlarged view of a section, designated as X in FIG. 9.

DETAILED DESCRIPTION

An aspect of the present invention is to provide a device which permits the shortest possible machining times.

In an embodiment, the invention provides a drive unit in which the active section of the pressure mechanism can be driven by means of a first drive in a movement plane that runs crosswise to the workpiece axis along a first movement trajectory, and can be driven by means of a second drive along a second movement trajectory that is at an angle to the first movement trajectory.

The device according to the invention makes it possible to move an active section of the pressure mechanism within a movement plane that runs crosswise to the workpiece axis, thereby controlling the position of the active section of the pressure mechanism within the movement plane. The active section is the section that cooperates with the fine-machining tool. The center of the active section will also be referred to below as the "active mid-point".

According to the invention, it is provided that, whenever needed, the pressure mechanism not only passively follows a movement of the circumferential workpiece surface that is to be machined, but rather that the position of the active section of the pressure mechanism can be systematically controlled within the movement plane by means of the first drive and the second drive of the drive unit.

The control of the position of an active section of the pressure mechanism within the movement plane has the advantage that, in order to prepare for the fine machining of the circumferential workpiece surface, the active section of the pressure mechanism can be moved into a target position. This target position depends on the rotational position of the circumferential workpiece surface that is the next one to be machined, relative to the axis of the workpiece. The position of the circumferential workpiece surface relative to the workpiece axis varies, as described above, along a circular trajectory. The pressure mechanism can now be moved into an appropriate position in order to prepare for the fine machining, irrespective of the position of the circumferential workpiece surface along this circular trajectory. After completion of a fine-machining procedure, the pressure mechanism can be removed from the circumferential workpiece surface once again, irrespective of the current rotational position of the workpiece, and it can be moved into a position in which the crankshaft can be handled (for example, rotated around the workpiece axis and/or moved along the workpiece axis), especially in order to prepare for the fine machining of another circumferential workpiece surface.

Another advantage of the device according to the invention can be seen in the fact that it can also be used for purposes of adjusting the distance in case of retooling; in other words, if a workpiece type having a different dimension is to be machined, then the device can automatically adapt to this.

According to the invention, it has been ascertained that the machining times of workpieces such as crankshafts or camshafts can be markedly reduced in that the idle times are reduced, in other words, the times during which the fine-machining tool is disengaged from the circumferential workpiece surface. The device according to the invention permits a considerable reduction of these idle times; especially after the completion of a machining phase of a circumferential workpiece surface, it is not necessary to rotate the workpiece in such a way that the circumferential workpiece surface assumes a specific position that is suitable for a conventional fine-machining device along the circular trajectory around the workpiece axis. On the contrary, the pressure mechanism can be placed into any desired position, irrespective of the position of the circumferential workpiece surface along the circular trajectory. After the completion of a machining phase, the pressure mechanism can be removed from the workpiece, irrespective of the current position of the circumferential workpiece surface along the circular trajectory around the workpiece axis.

In a preferred embodiment of the invention, it is provided that the first movement trajectory and the second movement trajectory run essentially perpendicular to each other. In this manner, the adjustment distances of the first drive and of the second drive can be shortened.

It is preferable for at least one of the movement trajectories to be a straight line. This allows the use of a relatively simple and yet high-precision linear drive, for example, a pneumatic or hydraulic or electric drive.

Moreover, it is preferable for at least one of the movement trajectories to have the shape of a circular arch. In this context, it is also preferable for the movement of the active section of the pressure mechanism along the circular arch-shaped trajectory to be associated with a pivoting of the pressure mechanism around a pivot axis. This allows for a compact and stable guidance of the pressure mechanism along one of the movement trajectories.

Furthermore, it is preferable for a switchable connection means to be provided in order to establish and undo an operative connection between the first drive and the pressure mechanism and/or between the second drive and the pressure mechanism. This has the advantage that, when the workpiece is rotated around the workpiece axis by means of a rotary drive unit, the drives of the drive unit are not necessarily coupled to the pressure mechanism. As a result, the drives of the drive unit are less stressed and/or the processing precision can be improved.

In another embodiment of the invention, a holding means that is independent of the first drive and of the second drive is provided for holding the pressure mechanism in a position of the active section of the pressure mechanism that can be predefined by means of the drives. The holding means can be configured, for example, in the form of a braking means and it makes it possible to hold the active section of the pressure mechanism in a predefinable position without, for example, weight-induced forces acting on the drives.

Moreover, it is preferable for a bearing means to be provided in order to support the pressure mechanism on a frame. The bearing means makes it possible to guide the pressure mechanism within the movement plane of the drive unit that runs perpendicular to the workpiece axis.

Preferably, the bearing means comprises a linear bearing and a pivot bearing and/or a compound rest slide, that is to say, a combination of two linear bearings. This allows the pressure mechanism to be mounted in a simple, compact and stable manner.

Another advantageous embodiment of the invention comprises a force-application mechanism that exerts braking and/or accelerating forces onto a bearing part of the bearing means that moves back and forth between two reversal positions. Such a force-application mechanism permits an equalization of inertia-induced mass forces. Embodiments of such a force-application mechanism are described in European patent application 12152051.4 of this same applicant, filed on Jan. 23, 2012. Regarding the structure and mode of operation of the force-application mechanism, reference is hereby made to the above-mentioned European patent application.

In an advantageous manner, the fine-machining tool is a finishing tool for the finish machining of the circumferential workpiece surface. The finishing tool is, for example, a finishing belt that is pressed against the circumferential workpiece surface by means of the active section of the pressure mechanism. The finishing tool can also be a finishing stone that is pressed against the circumferential workpiece surface by means of the pressure mechanism.

If the fine-machining tool is a finishing tool, it is preferable for an oscillatory drive to be provided in order to impart the workpiece with an oscillatory movement that is parallel to the workpiece axis. In conjunction with a rotation of the workpiece surface that is to be machined, such an oscillatory drive exhibits a cross-hatched structure that is characteristic for finish machining.

According to one embodiment of the invention, a rotary drive unit is provided for rotating the workpiece. Such a rotary drive unit comprises, for example, a headstock and a tailstock.

Within the scope of a method according to the invention for operating a device as described above, it is possible that only the above-mentioned rotary drive unit is employed to rotate the workpiece, and that the first drive and the second drive of the drive unit are inactive. Here, it is preferable if, during the machining of the circumferential workpiece surface, at least one of the drives, especially both drives, is/are not operatively connected to the pressure mechanism, for example, in that at least one above-mentioned switchable connection means is used. Moreover, when a circumferential workpiece surface is machined using a rotary drive unit, it is preferable if a force-application mechanism, likewise described above, is provided which permits an equalization of inertia-induced mass forces.

In another method according to the invention for operating an above-mentioned device, the rotary drive unit is employed to rotate the workpiece so that the circumferential workpiece surface is moved along a circular trajectory around the workpiece axis. At the same time, however, the first drive and/or the second drive is/are actuated in such a way that the active section of the pressure mechanism is moved along the same circular trajectory around the workpiece axis. This has the advantage that the pressure mechanism is not passively moved along due to the rotational movement of the workpiece, but rather, it actively executes an identical movement. Such a method can also be referred to as an "active mass equalization" and, in particular, it makes it possible to dispense with the above-mentioned force application in order to equalize inertia-induced mass forces.

In accordance with another method according to the invention for operating a device as described above, exclusively the first drive and/or the second drive, that is to say, not the above-mentioned rotary drive unit, is/are used in order to rotate the workpiece around the workpiece axis. Here, a movement of the first drive and/or of the second drive is transmitted via the pressure mechanism to the circumferential workpiece surface and the circumferential workpiece surface is rotated around the workpiece axis. A rotary drive unit of the above-mentioned type can be present here, but it remains inactive. Accordingly, it might also be the case that a rotary drive unit of the above-mentioned type is not present.

If the rotation of the circumferential workpiece surface that is to be machined is rotated around the workpiece axis exclusively by means of the first drive and/or by means of the second drive, it is possible to set a radius and/or a rotation mid-point of a circular trajectory of an active section of the pressure mechanism and/or to vary it during the movement of the active section of the pressure mechanism. Hence, it is possible to intentionally diverge from the circular trajectory that the circumferential workpiece surface describes during the course of a rotation around the workpiece axis. Through the systematic deviation from such a circular trajectory, it is possible to influence the eccentricity and/or the concentricity of the circumferential workpiece surface.

Additional features and advantages of the invention are the subject matter of the description below and of the depicted drawing of a preferred embodiment.

An embodiment of a device for the fine machining of a workpiece in the form of a crankshaft or a camshaft for finishing purposes is designated in the drawing in its entirety by the reference numeral 10. For the sake of clarity, the workpiece that is to be machined is not shown in FIG. 1. The workpiece is preferably a crankshaft or a camshaft. The workpiece has an axis 12 that runs concentrically to main bearings of the workpiece. The workpiece also has lifting bearings that are offset relative to the workpiece axis 12 by a distance 14. The lifting bearing axis that runs concentrically to a circumferential workpiece surface that is to be machined is designated by the reference numeral 16 in FIG. 1. In order for the workpiece to be rotated around its axis 12, a rotary drive unit 18 can be provided that comprises, for example, a schematically shown headstock 20 and a tailstock 22.

In a preferred embodiment, the workpiece or a combination consisting of the workpiece and the rotary drive unit 18 can be imparted by means of an oscillatory drive 24 with an oscillatory movement (i.e. a back-and-forth movement) in a direction that is parallel to the workpiece axis 12. For this purpose, it is conceivable to arrange the rotary drive unit 18 on a carriage (not shown here) that is then imparted with an oscillatory movement by means of the oscillatory drive 24.

During the rotation of the workpiece around the its axis 12, the circumferential workpiece surface that is to be machined describes a circular trajectory 26 that is concentric to the workpiece axis 12 and that is sketched in FIG. 1.

The device 10 comprises a pressure mechanism that is designated in its entirety by the reference numeral 28. The pressure mechanism 28 has pressure arms 30 and 32 that can each be pivoted around pivot axes 34, 36 of the pressure arms. The pressure arms 30, 32 each have shell-shaped pressure elements 38, 40 that serve to press a fine-machining tool 42, especially in the form of a finishing belt 44 (see FIG. 3).

The pressure mechanism 28 is supported on a stationary frame 48 by a bearing means that is designated in its entirety by the reference numeral 46.

The bearing means 46 comprises a pivot arm 50 that is connected to the pressure mechanism 28 and that can be pivoted around a pivot axis 52 of a pivot bearing 54. When the pivot arm 50 is pivoted around the pivot axis 52, an active section 55 of the pressure mechanism 28 moves along a curved trajectory 56 that runs essentially in a vertical direction relative to the direction of the force of gravity.

The pivot bearing 54 is arranged on a carriage 58 that can be moved relative to a carriage support 60 that is affixed to the frame. The carriage support 60 can preferably be moved along a carriage support axis 61 that runs parallel to the workpiece axis 12 along the frame 48, and it can be affixed to the frame 48.

When the carriage 58 is moved relative to the carriage support 60, the pressure mechanism 28 and its active section 55 move along a movement trajectory 62 which, in particular, is rectilinear and that especially runs in the horizontal or vertical direction relative to the direction of the force of gravity, or else it runs at an angle thereto.

The movement trajectories 56 and 62 span a movement plane of the active section 55 of the pressure mechanism 28 that runs perpendicular to the workpiece axis 12.

Together, the carriage 58 and the carriage support 60 form a linear bearing 64 of the bearing means 46. The linear bearing 64 and the pivot bearing 54 of the bearing means 46 ensure that, when a workpiece is driven around the workpiece axis 12 by means of the rotary drive unit 18, the active section 55 of the pressure mechanism 28 can passively follow the circular trajectory 26 of the circumferential workpiece surface that is to be machined.

The device 10 comprises a drive unit 66, described below, that has a first drive 68 and a second drive 70.

The first drive 68 comprises a drive piston 72 whose end is connected to a drive element 74. The drive element 74 penetrates a groove 76 of the carriage 58. In FIG. 1, the carriage 58 is in its maximum front position in which the drive element 74 is in contact with the rear bed of the groove 76 relative to the pressure mechanism 28. In the maximum front position of the carriage 58, the active section 55 of the pressure mechanism 28 is in the "three o'clock position" of the circular trajectory 26 of the workpiece.

The first drive 68 is connected, for instance, to the carriage support 60. The second drive 70 is connected, for instance, to the pivot arm 50 of the bearing means 46.

The second drive 70 has a drive piston 78 that is connected to a drive element 80 in the form of a drive roller. The drive roller 80 is designed to cooperate with a disk cam 82. The disk cam 82 is preferably connected to the carriage 58.

The device 10 also comprises a force-application mechanism 84 that, during the course of a movement of the carriage 58, exerts braking and/or accelerating forces parallel to the movement trajectory 62 in order to reduce inertia-induced mass forces of parts of the device 10 that are moved along or parallel to the movement trajectory 62 during the machining of a circumferential workpiece surface.

Another force-application mechanism 86 exerts braking and/or accelerating forces onto parts of the device 10 that are pivoted back and forth—corresponding to the trajectory 56—during the course of the fine machining of a circumferential workpiece surface.

The device 10 also comprises a connection means 88 whose structure and function are described specifically in reference to FIGS. 5 and 10. The connection means 88 serves to establish or undo an operative connection between the first drive 68 and the carriage 58 and the pressure mechanism 28.

The components of the device 10, especially the pressure mechanism 28, the bearing means 46, and the drives 68 and 70 are arranged offset with respect to each other, resulting in an especially streamlined structure, also shown in FIG. 2. For example, the width 90 ("cartridge width") that has been measured parallel to the workpiece axis 12 of a cartridge accessory 92 is merely between 32 mm and 40 mm. This makes it possible to use a plurality of cartridge accessories 92, which are arranged parallel to each other as is shown schematically in FIG. 2 by the reference numerals 92a, 92b and 92c. The distance between each of the cartridges 92 corresponds to the distance of the circumferential workpiece surfaces that are to be machined simultaneously.

FIG. 3 shows a section of a workpiece 94, especially of a crankshaft. The section shown is a lifting bearing 96 with a circumferential workpiece surface 98.

During the machining of the circumferential workpiece surface 98 by means of the finishing belt 44, the lifting bearing 96 rotates around the workpiece axis 12 along the circular trajectory 26. In this process, the active section 55 of the pressure mechanism 28—passively following the movement of the lifting bearing 96—is likewise moved along the circular trajectory 26. This movement consists of a pivoting movement of the pivot arm 50 around the pivot axis 52 and a thrusting movement of the carriage 58 relative to the carriage support 60.

In the case of the example describing a workpiece 12 that is being driven in a conventional manner by means of the rotary drive unit 18, the drives 68 and 70 are deactivated. The first drive 68 is deactivated by switching the connection means 88, so that it is uncoupled from the drive unit 68. During the course of the uncoupling, the drive element 74 can move freely inside the groove 76 of the carriage 58. In this manner, a thrusting movement of the carriage 58 is not transmitted to the drive piston 72 of the first drive 68.

The second drive 70 is uncoupled from the pressure mechanism 28 in that the drive piston 78 is retracted and the drive element 80 is lifted off of the disk cam 82.

Based on the state shown in FIG. 3, which corresponds to the completion of a main machining phase of the circumferential workpiece surface 98 of the lifting bearing 96, the idle time phases described below with reference to FIGS. 4 to 10 are carried out in order to prepare for another main machining phase.

In a first idle time phase, which is shown in FIG. 4, the second drive 70 is actuated in such a way that the drive piston 78 moves the drive element 80 in the direction of the pressure mechanism 28 until the drive element 80 comes into contact with the disk cam 82.

In addition, the connection means 88 is switched in such a way that an operative connection is established between the drive element 74 of the first drive 68 and the carriage 58. For this purpose, the connection means 88 has a locking element 100 (see FIG. 5) that can be moved out of an unlocked released position (shown by a broken line in FIG. 5) into a locked position (shown by solid lines in FIG. 5). For this purpose, the connection means 88 has a locking drive 102 that cooperates with the locking element 100 via a drive rod 104. When the locking element 100 is in the locked position, the drive element 74 is captured between a back wall of the groove 76 of the carriage 58 and the locking element 100.

In a subsequent idle time phase, which is shown in FIG. 6, the pressure mechanism 28 is actuated, so that the pressure arms 30 and 32 can be opened in a manner that is generally known and therefore not explained in greater detail here, and the finishing belt 44 is disengaged from the circumferential workpiece surface 98. The pressure arms 30 and 32 are opened to such an extent that a free space 106 is formed that is larger than a surface enveloping the rotating workpiece 94 and preferably also larger than the outer dimensions of a headstock 20 and/or a tailstock 22. If the created free space 106 is not sufficient for the workpiece to be extended along its workpiece axis 12, it has proven to be advantageous if the pressure mechanism 28 can be retracted crosswise to the workpiece axis 12, so that it moves away from the surface enveloping the workpiece 94.

In FIG. 6, another circumferential workpiece surface 94 is designated with the reference numeral 108. The circumferential workpiece surface 108 forms the radial outer delimitation of another lifting bearing 110 of the workpiece 94. With respect to the workpiece axis 12, the lifting bearings 96 and 110 of the workpiece 94 are angularly offset relative to each other, for example, by an angle of 120°, also see FIG. 7. If, after the completion of the finish machining of the lifting bearing 96, the circumferential workpiece surface 108 of the lifting bearing 110 is to be machined—starting from the rotational position of the workpiece 94 shown in FIG. 3—in a subsequent main machining time phase, it is advantageous if the workpiece 94 can remain in its rotational position around the workpiece axis 12 and only the pressure mechanism 28 is moved by means of the drive unit 66. This is especially applicable if several cartridges 92a, 92b, 92c are used.

Starting from the situation of the pressure mechanism 28 shown in FIG. 6, in a third idle time phase, which is shown in FIG. 7, the first drive 68 is actuated in such a way that the pressure mechanism 28 is moved along the movement trajectory 62 (see FIG. 1) away from the workpiece 94 into a maximum rear position. As a result, an active mid-point 112 of the active section 55 assumes a maximum rear position. When the grip arms 30 and 32 are closed, the active mid-point 112 is at least approximately congruent with a lifting bearing axis 16 of a circumferential workpiece surface 98, 108 that is to be machined.

In addition to the movement described above, the pressure mechanism 28 is also pivoted around the pivot axis 52. This pivoting movement is controlled by the second drive 70. For example, the pressure mechanism 28, as can be seen in FIGS. 6 and 7, can start from the pivot position shown in FIG. 6 and can be pivoted downwards into the pivot position shown in FIG. 7. For this purpose, the drive piston 78 of the second drive 70 can be retracted, so that the pressure mechanism 28, which is top-heavy relative to the pivot axis 52, pivots downwards around the pivot axis 52. In this process, the drive element 80 of the second drive 70 rolls on the disk cam 82.

The pressure mechanism 28 is preferably pivoted in the maximum rear position of the first drive 68, in which the pressure mechanism 28 and its active mid-point 112 are thus positioned at a maximum distance from the workpiece 94.

In order to prepare for the machining of the circumferential workpiece surface 108 of the lifting bearing 110, it is necessary to set the position of the active mid-point 112 of the pressure mechanism 28 along the movement trajectory 62. For this purpose, in a fourth idle time phase shown in FIG. 8, the drive piston 72 is extended so that, via the locking element 100, the drive element 74 moves the carriage 58 and thus also the pressure mechanism 28—in its state in which it is pivoted around the pivot axis 52—in such a way that the active mid-point 112 shown in FIG. 7 is congruent with the lifting bearing axis 16 of the lifting bearing 110.

Starting from the situation shown in FIG. 8, in a final idle time phase shown in FIG. 9, the grip arms 30 and 32 of the pressure mechanism 28 are closed and a positive and non-positive connection is established between the pressure elements 38, 40, the finishing belt 44 and the circumferential workpiece surface 108 of the lifting bearing 110. After the pressure arms 30, 32 have been closed, the second drive 70 is actuated in such a way that the drive element 80 is no longer in contact with the disk cam 82. Moreover, the connection means 88 is switched in such a way that that the locked state between the carriage 58 and the first drive 68 is undone. For this purpose, the locking element 100, staring from the locked position shown in FIG. 8, is moved into the unlocked position shown in FIGS. 9 and 10. As a result, the drive element 74 of the first drive 68 is unlocked, so that the drive element 74 can move freely inside the groove 76 of the carriage 58. Finally, the drive element 74 is moved in the direction of the workpiece 94 in that the drive piston 72 is extended by means of the first drive 68 so that the drive element 74 is moved in the direction of the front end of the groove 76 of the carriage 58.

Subsequently, the circumferential workpiece surface 108 of the lifting bearing 110 can be machined during a main machining time phase.

During the main machining time of a lifting bearing 96, 110 of the workpiece 94, it is also possible to use the drive unit 66 in addition to or as an alternative to the rotary drive unit 18. It is obvious that a drive 68, 70 of the drive unit 66 that is to be used to generate a movement of the pressure mechanism 68 has to be operatively connected to the pressure mechanism 28; for example, when the first drive 68 is used, the connection means 88 establishes an operative connection between the first drive 68 and the carriage 58. When the second drive is used, the drive element 80 has to be in contact with the disk cam 82.

The use of the drives 68 and/or 70 allows the pressure mechanism 28 to be carried along and to be superimposed over the rotational movement of the rotary drive unit 18.

As an alternative to this, only the drive unit 66 is used, so that a rotary drive for the workpiece 64 is provided on the tool side and a rotary drive unit 18 can remain deactivated or can be dispensed with entirely. For this purpose, it would be advantageous for the drive 70 to be coupled in such a way that it can transmit tractive and compressive forces.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A device for the fine machining of a circumferential workpiece surface arranged eccentrically relative to an axis of a workpiece, the device comprising:
    a pressure mechanism comprising pressure elements configured to press a fine-machining tool against the circumferential workpiece surface so as to create a form-fitting engagement between the pressure elements and the circumferential workpiece surface;
    a drive unit configured to drive an active section of the pressure mechanism via a first drive in a movement plane that runs crosswise to the workpiece axis along a first movement trajectory, and via a second drive along a second movement trajectory that is at an angle to the first movement trajectory; and
    a switchable connection mechanism configured to establish and undo an operative connection between both the first drive and the pressure mechanism and the second drive and the pressure mechanism,
    wherein, when the operative connection is established, the first drive and the second drive are mechanically coupled to the pressure mechanism such that the first drive and second drive are configured to control a position of the active section within the movement plane that runs crosswise to the workpiece axis irrespective of a position of the circumferential workpiece surface,
    wherein, when the operative connection is undone, the first drive and the second drive are mechanically uncoupled from the pressure mechanism such that the first drive and the second drive are unable to control the position of the active section such that the pressure mechanism passively follows a movement of the circumferential workpiece surface due to the form-fitting engagement, and
    wherein at least one of the movement trajectories has a shape of a circular arch.

2. The device as recited in claim 1, wherein the first movement trajectory and the second movement trajectory run essentially perpendicular to each other.

3. The device as recited in claim 1, wherein at least one of the movement trajectories is rectilinear.

4. The device as recited in claim 1, further comprising a bearing mechanism configured to support the pressure mechanism on a frame.

5. The device as recited in claim 4, wherein the bearing mechanism comprises at least one of a linear bearing and a pivot bearing or a compound rest slide.

6. The device as recited in claim 4, further comprising a force-application mechanism configured to exert at least one of braking or accelerating forces onto a bearing part of the bearing mechanism that moves back and forth between two reversal positions.

7. The device as recited in claim 1, wherein the fine-machining tool is a finishing tool for the finish machining of the circumferential workpiece surface.

8. The device as recited in claim 1, further comprising an oscillatory drive configured to impart the workpiece with an oscillatory movement that is parallel to the workpiece axis.

9. The device as recited in claim 1, further comprising a rotary drive unit configured to rotate the workpiece around the workpiece axis.

10. The device as recited in claim 1, wherein the workpiece comprises a lifting bearing for one of a crankshaft or a camshaft.

11. A method for operating a device for the fine machining of a circumferential workpiece surface arranged eccentrically relative to an axis of a workpiece, the method comprising:
providing a pressure mechanism comprising pressure elements configured to press a fine-machining tool against the circumferential workpiece surface so as to create a form-fitting engagement between the pressure elements and the circumferential workpiece surface;
driving an active section of the pressure mechanism with a drive unit that comprises a first drive and a second drive, the first drive driving the active section in a movement plane that runs crosswise to the workpiece axis along a first movement trajectory, and the second drive driving the active section along a second movement trajectory that is at an angle to the first movement trajectory,
establishing an operative connection between both the first drive and the pressure mechanism and the second drive and the pressure mechanism, and
undoing the operative connection between both the first drive and the pressure mechanism and the second drive and the pressure mechanism,
wherein, when the operative connection is established, the first drive and the second drive are mechanically coupled to the pressure mechanism such that the first drive and second drive are configured to control a position of the active section within the movement plane that runs crosswise to the workpiece axis irrespective of a position of the circumferential workpiece surface,
wherein, when the operative connection is undone, the first drive and the second drive are mechanically uncoupled from the pressure mechanism such that the first drive and the second drive are unable to control the position of the active section such that the pressure mechanism passively follows a movement of the circumferential workpiece surface due to the form-fitting engagement, and
wherein at least one of the movement trajectories has a shape of a circular arch.

12. The method as recited in claim 11, further comprising:
imparting an oscillatory movement on the workpiece with an oscillatory drive, the oscillatory movement being parallel to the workpiece axis; and
rotating the workpiece with a rotary drive unit when the operative connection is undone.

13. The method as recited in claim 11, further comprising:
rotating the workpiece with a rotary drive unit such that the circumferential workpiece surface moves along a circular trajectory around the workpiece axis; and
when the operative connection is established, actuating at least one of the first drive or the second drive such that the active section of the pressure mechanism moves along the same circular trajectory around the workpiece axis.

14. The method as recited in claim 11, wherein, when the operative connection is established, either the first drive or the second drive is used to rotate the workpiece around the workpiece axis.

\* \* \* \* \*